No. 832,245. PATENTED OCT. 2, 1906.
G. W. DURBROW.
HEAD GATE.
APPLICATION FILED NOV. 8, 1904.
3 SHEETS—SHEET 1.
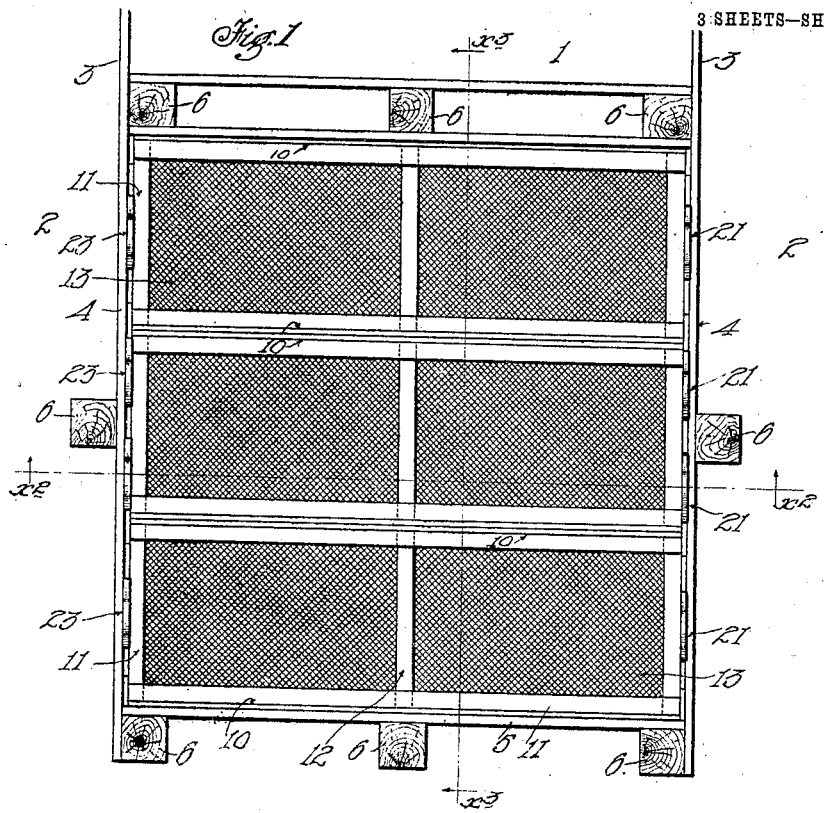
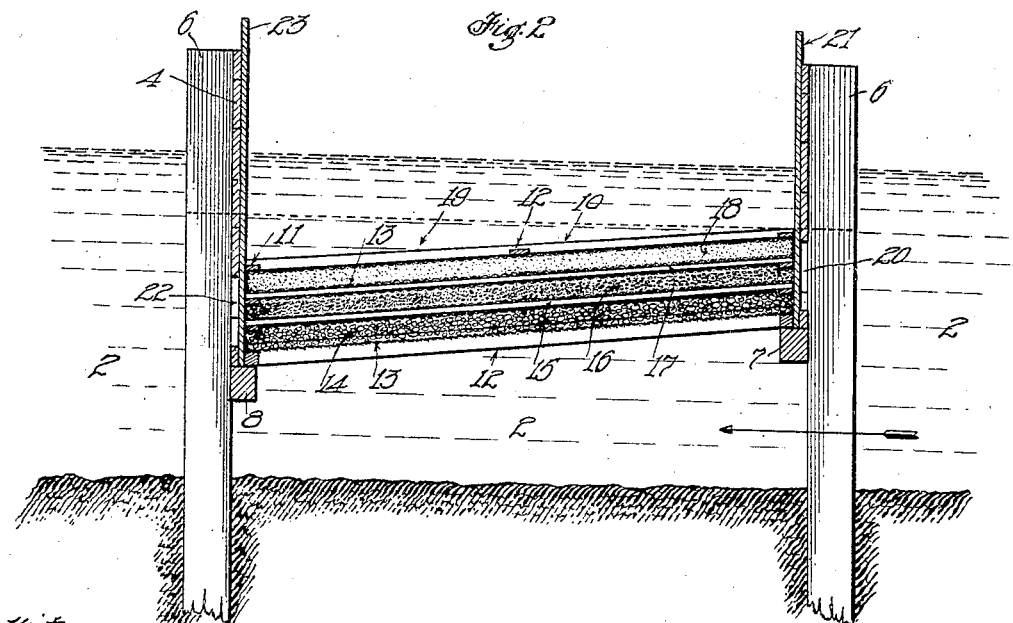
Witnesses
Stanaufield
A. P. Knight
Inventor
George W. Durbrow
By Townsend Bros
His Attys No. 832,245. PATENTED OCT. 2, 1906.
G. W. DURBROW.
HEAD GATE.
APPLICATION FILED NOV. 8, 1904.
3 SHEETS—SHEET 2.
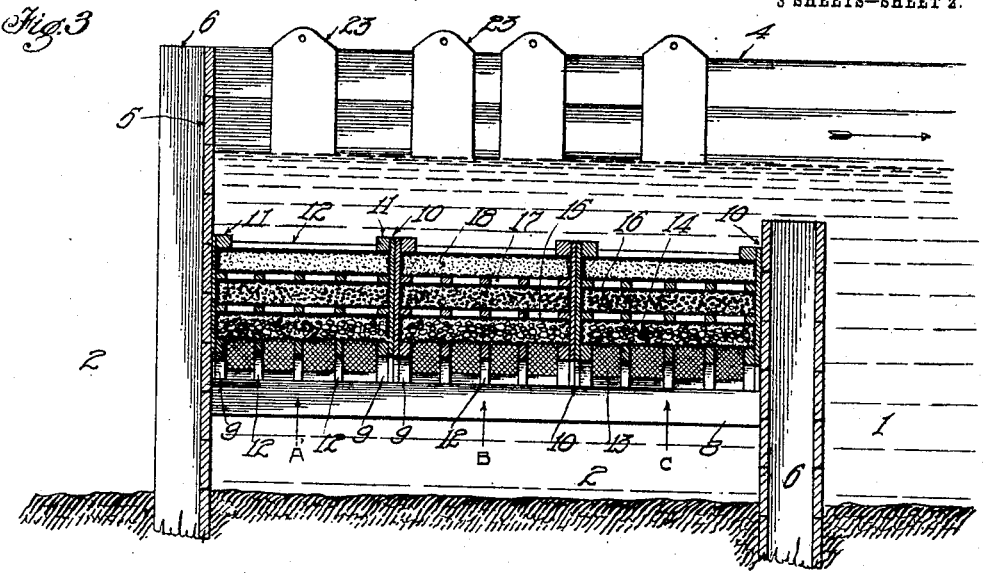
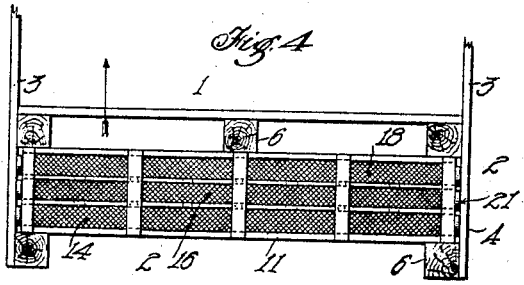
Witnesses
Inventor
George W. Durbrow
By Townsend Bros
His attys

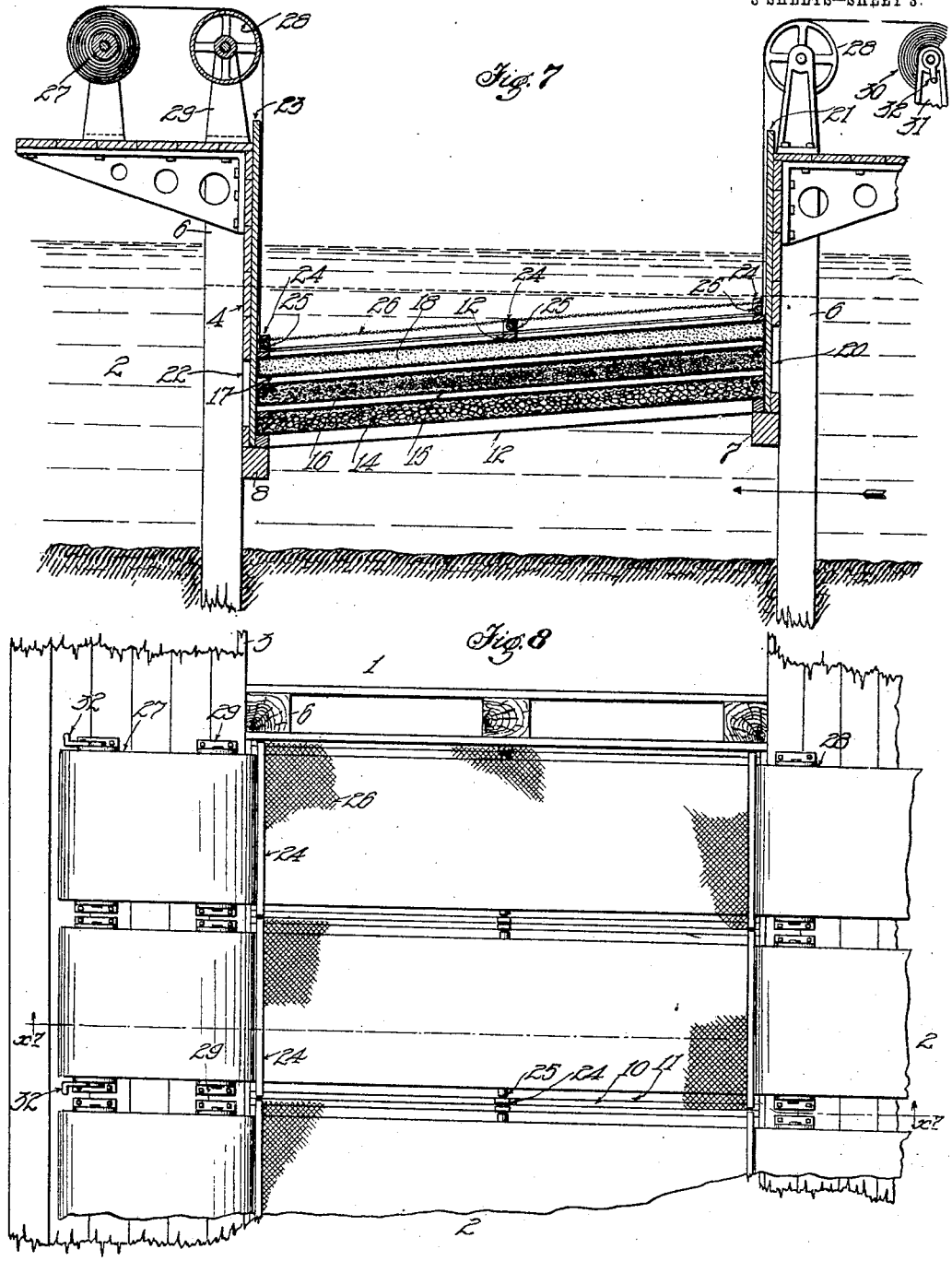

UNITED STATES PATENT OFFICE.

GEORGE W. DURBROW, OF INDIO, CALIFORNIA, ASSIGNOR TO DURBROW FILTRATION COMPANY, OF YUMA, ARIZONA TERRITORY, A CORPORATION OF ARIZONA TERRITORY.

HEAD-GATE.

No. 832,245.        Specification of Letters Patent.        Patented Oct. 2, 1906.

Application filed November 8, 1904. Serial No. 231,830.

*To all whom it may concern:*

Be it known that I, GEORGE W. DURBROW, a citizen of the United States, residing at Indio, in the county of Riverside, State of California, have invented new and useful Improvements in Head-Gates, of which the following is a specification.

This invention relates to head-gates designed for use in irrigation systems or for municipal or domestic water-supply systems, and is adapted to remove objectionable portions of the silt carried in suspension by the water.

In irrigation systems the ditches have to be dug out frequently to remove the sand which accumulates therein, and this removal of sand from the ditches constitutes one of the greatest expenses of maintaining irrigation systems, and the present invention is therefore of great value in this connection because it prevents the entrance of sand into the ditch.

Another object of the invention is to provide for readily getting rid of accumulations which may form at the head-gate.

Other advantages of the invention will appear from the following description.

This invention includes a head-gate comprising a box open at two sides and a filter composed of one or more filter-sections interposed between said open sides. Preferably the filter is open at the bottom side and at one of the lateral sides, and usually it is also open at the top side; but for all practical purposes it is immaterial whether the top side be open or closed, as the water never rises to the same or above the tops of the lateral sides. A desirable construction consists in submerging the open bottom side of the head-gate in the stream from which water is to be drawn and also submerging in said stream filtering material interposed between said open sides— that is to say, between the open inlet side and the open outlet side.

The accompanying drawings illustrate the invention.

Referring to the drawings, Figure 1 is a plan view of the head-gate. Fig. 2 is a section taken on line $X^2 X^2$ in Fig. 1, illustrating the head-gate in place in the main canal or river and at the head of the ditch. Fig. 3 is a section on line $X^3 X^3$ in Fig. 1. Fig. 4 is a plan view showing a modified form of the head-gate, in which the strata of filtering material are disposed in vertical planes. Fig. 5 is a front elevation of the form of head-gate shown in Fig. 4. Fig. 6 is a section on line $X^6 X^6$ in Fig. 5. Fig. 7 is a cross-section similar to Fig. 2, illustrating a form slightly modified from that shown in Fig. 2, the view being taken on line $X^7 X^7$ in Fig. 8. Fig. 8 is a plan view, part being broken away, of the form shown in Fig. 7.

In the preferred form of this invention the head-gate is constructed with one or more cages containing filtering material, as gravel strata. If more than one cage is employed, different grades of gravel or other filtering material may be employed in the respective cages, varying, for instance, in the coarse cage from one-half-inch mesh to one-sixteenth-inch mesh gravel in the finer cage. The coarse cage is so arranged as to first receive the water as it enters the filter, the intermediate cages, if any, being arranged according to their respective orders of fineness, the finest cage being that through which the water last passes. Each cage for the gravel or other filtering material is preferably formed of sheets of perforated galvanized iron or of screens or of other foraminous means for inclosing and keeping the respective layers of gravel separated. A small space— for example, of about one inch width— is preferably provided between each two cages, which will allow a certain percentage of water to flow out of the filter and carry out the sand, soil, or silt and prevent it from collecting in the head-gate. This flow may be continuous or by means of a gate or gates may be made intermittent. The head-gate is preferably constructed with filter-sections arranged separately, so that any of the sections may be taken out of the head-gate when repairs are necessary. Each cage of the head-gate is placed under the surface of the water, preferably with the gravel strata inclined from the horizontal, the head-gate being located where the ditch joins the main canal or supply-stream and being so arranged that the water from the supply-stream or main canal passes into the head-gate at the bottom and first through the coarse-gravel layer and up through the intervening gravel layers, if any, thence out through the finest layer of gravel, if any, into the ditch, provision being made for preventing the water of the main supply-canal from entering the ditch except by passing through the filter.

Referring to Figs. 1 and 2, 1 designates the ditch, which is separated from the main canal 2 by a bulkhead 3, the sides of which are extended to form side walls 4. 5 is an end wall joining the side walls 4, the side walls 4 and end wall, as well as the bulkhead, being supported by uprights 6, which may be driven into the bottom of the stream, as shown in Fig. 2. It is thus seen that in this instance the head-gate consists in a box having lateral sides or walls 3 4 5, an open bottom side, (indicated at 12 in Fig. 2,) and an open lateral side, (indicated at 1 in Fig. 1,) while the filtering material is interposed between said sides, as will hereinafter more fully appear. The uprights 6, which lie on the upstream side of the head-gate, support a cross-beam 7, while the uprights 6 on the downstream side of the head-gate support a cross-beam 8, which is arranged slightly lower than the cross-beam 7. Resting upon the beams 7 and 8 are three lower frames 9, each of which comprises side strips 10, end strips 11, and three intermediate strips 12, the strips being rigidly fastened together and forming a rectangular frame. Upon the top of each frame 9 a wire-screen cage 13 is provided, and contained within each cage is a layer of coarse gravel 14. A series of frames 15, each of which is constructed similarly to the frame 9, rest upon the gravel-cages 14, while cages of finer gravel 16 lie immediately above the frames 15. Another series of frames 17, each of which is similar to the frame 9, lies upon the top of the cages 16, while another series of cages of still finer gravel 18 is supported by the frames 17. The frames 19 are constructed similarly to the frames 9 and lie immediately above the cages 18. The wire-netting of the upper cage serves to confine the upper fine gravel and prevents the same from being washed upwardly as the water percolates through the filter. The strata of gravel being thus separated by screens and frames, spaces are formed between the strata which have a depth equal to the thickness of a frame. On the upstream side the walls 4 are provided with openings 20, which are normally closed by vertical gates 21. The downstream side of the head-gate is also provided with openings 22 and is preferably supplied with vertical gates 23, which are constructed similarly to the gates on the upstream side. Gates 21 and 23 are adapted to cover or expose substantially the entire upstream and downstream sides of the filter and contact with the ends of cages 14, 16, and 18 when closed to cause all the water to pass transversely through said cages.

In use the water from the supply-stream percolates up through the strata of gravel, and its velocity is thereby decreased, the sand being precipitated and carried on downstream, and as the water passes through the head-gate it may deposit sand, silt, or soil in the spaces between the cages, and when the gate is left open such material will work its way down the spaces between the cages to the downstream end of the head-gate and pass out through the openings 22. The water having thus been freed from sand and other sediment passes from the uppermost layer of fine gravel into the ditch. The head gate thus arranged continually cleans itself while in operation; but if it should become clogged from any cause the gates 21 may be opened, which will allow the stream to rush through the spaces between the gravel strata, and the rapid current will quickly clean out the spaces between the strata, or in practical operation both gates 21 and 23 may be normally kept closed, as shown in Figs. 2 and 7, except at intervals, when both may be opened for washing out the sediment. The strata of gravel are preferably arranged on an incline, as shown, so that the head-gate will the more readily clear itself of the deposits when in use. Although some water which passes into the head-gate does not get into the ditch, still a large percentage of it passes through the head-gate and into the ditch, the remainder serving to carry out the deposits. If desired, a further filtering material, such as burlap or cheese-cloth, may be used.

In Figs. 7 and 8 I have shown a filter constructed in sections and strips of burlap arranged over the sections respectively, each strip being held in place by rollers 24, carried on frames 25, the frames 25 also having wire screens 26 for holding the burlap in place. The burlap passes from a supply-roll 27 over a roller 28, mounted on standards 29, thence down under a roller 24, over the gravel strata and thence up, being wound on a reel 30, carried by standards 31. The reels 27 and 30 may be provided with suitable handles 32. The reel 27 stands considerably to one side of the head-gate, so that a considerable length of the burlap lies in a horizontal position, which disposes it most conveniently for cleaning, for instance, by means of a hose. Thus, by employing strips of sufficient length part of the strip may be cleaned while the rest is in use. Thus the operation of the reel does not have to be stopped whenever it is desired to clean the burlap. In the present embodiment the filter is formed in three sections, (designated A, B, and C,) and each section may be readily removed for repairs.

Figs. 4, 5, and 6 illustrate another form, in which the gravel strata are disposed in vertical planes. In Fig. 6 it will be noted that two of the lateral sides at right and left of the filtering material are open and that the bottom side, as indicated at 16, is also open. Referring particularly to Fig. 6, the gravel strata, with their frames, are constructed similarly to the form shown in Fig. 1, except that the edges of the frames rest upon the beams 35 and the bottom of the frames are open, so that water from the supply-stream 2 passes up into the gravel, thence out into the ditch 1. In order to protect the head-gate, a line of piles may be driven into the bed of the stream above the head-gate, which will not obstruct the flow of water, but which will divert logs or other drift.

What I claim is—

1. A head-gate comprising a box open at two sides and a filter composed of one or more filter-sections interposed between said open sides, suitable means for normally causing the water to pass through the sections one after the other, and means for allowing the water to flow in another direction through the sections when desired.

2. A head-gate comprising a box open at two sides and a filter composed of sections of filtering material interposed between said open sides, means for normally causing the water to pass through the sections in order, and means for allowing the water to flow in another direction along the line of the sections when desired.

3. A head-gate comprising a box open at the bottom and at another side and provided with filtering material and cages of netting retaining the said material in sections intact interposed between said open bottom and other side, means for supporting the cages and providing spaces between the cages, and vertical gates adapted to contact with the ends of said cages to close or expose substantially the entire upstream and downstream sides of the filter.

4. A head-gate comprising a box open at two sides and provided with filtering material, cages of netting retaining the filtering material in sections intact interposed between said open sides, means for supporting the cages and providing spaces between the cages, means for causing the water to pass sequentially through the sections when filtering, and means for allowing the water to pass in other direction when desired to clean the filter.

5. A head-gate comprising a box open at two sides and provided with filtering material, cages of netting retaining the filtering material in sections interposed between said open sides, frames supporting the cages, the frames being arranged substantially parallel to each other but inclined to the horizontal, the lower end of the sections being arranged on the downstream side.

6. A head-gate comprising a box open at the bottom and another side and provided with a filter composed of sections of filtering material, cages of netting retaining the respective sections intact interposed between said open bottom and other side, frames supporting the sections, a suitable structure for supporting the frames and for inclosing the sides of the sections, and vertical gates adapted to close or expose the upstream and downstream sides of the filter, said gates when closed being in contact with the ends of said cages.

7. A head-gate provided with a filter composed of sections of filtering material, cages of netting inclosing the respective sections of filtering material interposed between said open sides, frames for supporting the cages, a suitable structure with cross-beams one of which is arranged lower than the other, the lower frame resting upon said beams in an inclined position.

8. A head-gate provided with a filter composed of sections of filtering material, cages of netting inclosing the respective sections of filtering material interposed between said open sides, frames for supporting the cages, a suitable structure with cross-beams one of which is arranged lower than the other, the lower frame resting upon said beams in an inclined position, and gates in said structure for normally preventing the water from entering the structure except at the bottom and whereby the water may be allowed to flow through the sections along the line of the frames when said gates are opened to clean the filter.

9. A head-gate comprising a box having its under side open and submerged in the supply-stream, and also having one side open to the ditch which is to carry off the water and being closed at the other lateral sides to the supply-stream, and a filter composed of one or more sections of filtering material submerged in the supply canal or river.

10. A head-gate comprising a box having its under side open and submerged in the supply-stream and also having one side open to the ditch which is to carry off the water and being closed at the other lateral sides to the supply-stream, a filter composed of one or more sections of filtering material submerged in the supply canal or river, and suitable gates for allowing the water to flow therethrough in the supply-stream direction to clean the filter when the gates are open.

In testimony whereof I have hereunto set my hand, at San Francisco, California, this 31st day of October, 1904.

GEORGE W. DURBROW.

In presence of—
ALFRED A. ENQUIST.
W. A. TOLEHARD.